Feb. 22, 1938.  J. F. FISHER  2,109,332
STOKER
Filed July 3, 1936
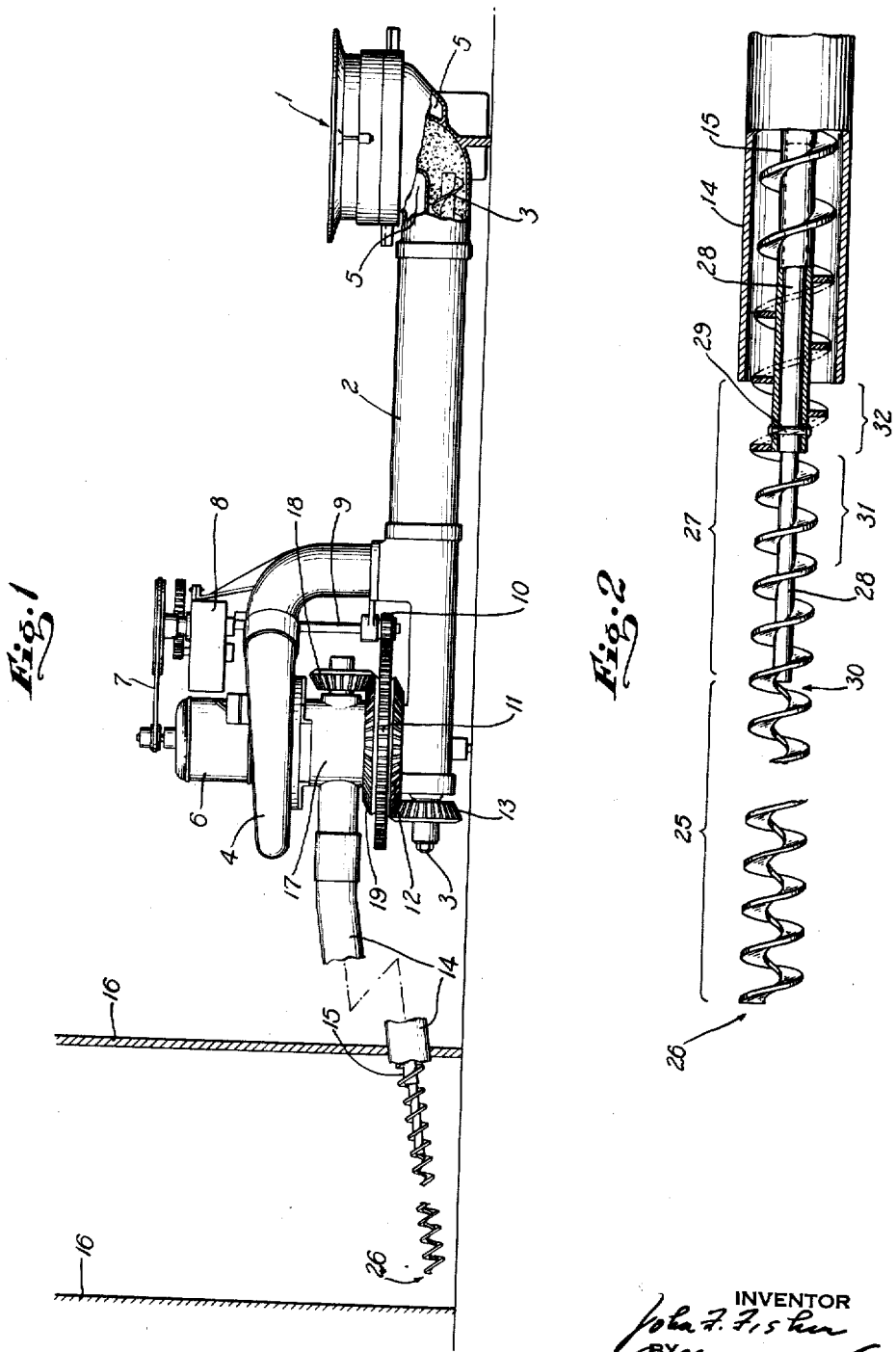
INVENTOR
John F. Fisher
BY
his ATTORNEYS Patented Feb. 22, 1938

2,109,332

UNITED STATES PATENT OFFICE 2,109,332

STOKER

John F. Fisher, Manheim, Pa., assignor to Henry M. Brooks, New York, N. Y., William Tudor Gardiner, Boston, Mass., and Jacob H. Nissley, Manheim, Pa., as Trustees Application July 3, 1936, Serial No. 88,709

7 Claims. (Cl. 198—64)

My invention relates to coal stokers that take their coal from relatively large storage spaces, such as the house coal bin, either directly or through the agency of a feeding device that supplies a hopper from which the stoker is fed directly. Customarily the screw type of conveyor is used with stokers of the smaller sizes, such as are used for heating homes, apartment houses, etc., and more especially my invention relates to screw conveyors for taking the coal for such stokers from the coal bin of the establishment served by the stoker.

In taking coal from such large storage spaces as the house bin (i. e., the bin constituting the primary storage space and source of supply of coal for the establishment as distinguished from a hopper such as is frequently provided for these stokers), it is desirable that a considerable length of the conveyor be exposed to the coal beyond the end of the conduit through which the coal is conveyed from the bin. This permits a large percentage of the coal to be removed from the bin without the floor of the bin being sloped, or with the floor sloped to the minimum degree.

However, a screw exposed in a mass of coal tends to move bodily as it revolves, notably to rise, and if a considerable length of screw be exposed beyond the end of the conduit the rising action tends to force the screw against the wall of the end of the conduit and cause considerable friction at this point, and it also tends to crush the coal at the conduit end and produce bending stresses in the screw which frequently become severe enough to break the screw. Where a considerable length of screw has been exposed to the coal therefore it has been customary to provide a bearing for the end of the screw remote from the conduit to prevent the bodily motion. This is undesirable because if it should be necessary to remove the conveyor from the bin for any reason the screw cannot be replaced in its end bearing again without first emptying the bin of coal. The only alternative heretofore has been to expose only a few inches of the screw to the coal, but as before indicated, this is undesirable because as the bin empties a considerable amount of coal is left in the bin beyond the reach of the conveyor unless the bottom of the bin is rebuilt to slope it downwardly to the conveyor, and this materially increases the cost of installing a stoker.

My invention permits a long length of screw to be exposed to the coal without an end bearing. Briefly, I have found that by making at least a portion of the exposed part of the screw flexible, as by constructing the screw without a center shaft for example, the exposed portion of the screw can be permitted to rise or otherwise move bodily without harmful effect. By giving the screw appropriate flexibility therefore, and preferably using in conjunction with this flexibility certain features appearing hereafter, a considerable length of screw can be exposed to the coal in a satisfactory manner, and specifically without a bearing for the end of the screw so that a screw can be placed or replaced in a bin even though the bin is filled with coal.

The accompanying drawing illustrates the preferred form of my invention as applied to one well known form of small stoker. Fig. 1 is a diagrammatic elevation of the apparatus and a coal bin, partly in section. Fig. 2, drawn to a larger scale, is a sectional elevation of the portion of the coal conveyor and conduit at the bin.

Referring to Fig. 1: The burner 1, which in service is located in the furnace to be fired, is fed with coal and air through the conduit or conduits 2. The coal is conveyed to and forced upwardly through the center of the burner by the screw 3. The blower 4 provides combustion air under pressure which passes into the air chamber 5 of the burner head and thence through the grate into the upwardly flowing mass of coal. An electric motor 6 drives the blower directly, and also drives the burner screw 3 through the belt drive 7, speed reducing gearing in casing 8, shaft 9, gears 10 and 11, bevel gear 12 attached to gear 11, and bevel gear 13 fixed to the center shaft of the screw 3. A conduit 14 and a screw conveyor 15 therein convey the coal from the bin 16 to the burner screw 3 and the conduit containing the latter; the member 17 (on the lower end of which the large gear 11 is mounted), is a hollow casing and thus provides a passageway for the coal from conduit 14 to the coal screw 3. The bin screw conveyor 15 is driven by a bevel gear 18 at its end which meshes with a second bevel gear 19 attached to gear 11. This stoker will be recognized as a well known one, and the rather diagrammatic illustration and foregoing description of it will serve the present purposes.

The bin 16 can be regarded as the coal bin of the establishment, that is to say, the primary storage space and source of supply of coal of, say, the home heated by the fire at the burner 1, rather than a hopper of relatively small capacity such as is sometimes provided for a home-heating stoker. The bin 16 therefore may be some feet long and some feet wide. Also as ordinarily found in homes and other establishments customarily served by small stokers, the floor of the bin is flat. As illustrated, the conduit 14 of the bin conveyor extends into the bin a short distance. Beyond this end of the conduit the conveyor itself extends farther into the bin. For a part 25 of its length, this extension is made to have such flexibility that its inner end 26 can move bodily as its rotation in the coal may cause it to do, and particularly rise, without pressing the part of the conveyor 15 within the conduit 14 against the wall of this conduit unduly, and without exerting such bending stresses anywhere as may endanger breaking the screw. As illustrated, this can be accomplished by making this portion 25 without a center shaft, so this portion of the conveyor consists solely of the helix of the screw threads as it were; preferably the flexible part 25 comprises the major part of the length of the extension outside the conduit 14. The longitudinal bore or hollow through the helix (if there be any) may be of large or small diameter as best suits the conditions. It is not necessary however that this flexibility be extended up to the end of the conduit. For a short distance 27, at least a length of a few inches from the end of the conduit 14, the screw can be made substantially as rigid and inflexible as the customary screw conveyor having a center shaft. Taking advantage of this, I prefer to arrange for driving the extension by mounting this end of the helix on a center shaft 28 to which its driving connection is made. Preferably the drive connection is made by using a tube for the center shaft with which (at least the bin end of) the thread of the conveyor 15 is provided, or drilling this shaft longitudinally if a rod, and inserting the end of the shaft 28 into the tube for some distance and riveting the two together, as at 29 for example (Fig. 2). Thereby the extension is driven by and as a unit with the part of the bin conveyor contained in the conduit 14. The center shaft 28 can be inserted into the hollow of the helix as it were, and say up to the point 30 but fastened to the turns of the thread, by welding for example, throughout, say, only the lesser portion 31. The external diameter and the pitch of the thread of the extension or helix (both the part without a center shaft and the part containing the driving center shaft 28), and also the thickness of the wall of this thread, will be such as to cause the conveyor extension outside the conduit 14 to bring to the conduit the desired amount of coal when rotated at the speed determined on. As a result of this flexible construction the bin conveyor can be extended and exposed to the coal beyond the end of the conduit a considerable distance (a distance of some feet is practicable), without an end bearing to confine it against bodily movement. Such an extension however seems to bring toward the end of the conduit a tube or column of coal of somewhat greater diameter than the extension. To prevent this column jamming against the end of the conduit 14, which would put a heavy load on the screw, I preferably provide the exposed extension with a larger potential capacity immediately outside the conduit 14 than elsewhere, that is to say, throughout the portion 32. I believe that the capacity in the region 32 should be such, and this region should be of such length, that this part 32 of the conveyor can take in all the coal moved up to it, plus a slight amount more. At the same time, this portion 32 of the conveyor should not be so long as to itself move to the conduit end a tube of coal larger than the internal diameter of the conduit. This portion 32 therefore should neither be too short nor too long. The proper length and capacity are readily found however in any instance; they are such that the conveyor as a whole requires the least effort to operate it. Preferably, to the end indicated, I make the extension helix (including the part covering the center shaft 28) of lesser diameter and pitch of thread than the screw 15 within the conduit, and I extend the screw 15 with its greater diameter and pitch beyond the end of the conduit for a distance equal to approximately one turn of its thread, there joining the helix to it, as shown in Fig. 2.

It will be understood that my invention is not limited to the details of construction and operation illustrated in the accompanying drawing and described above, except as appears hereafter in the claims.

What is claimed is:

1. A stoker having a burner and conduit means and conveyor means in the conduit means to transport fuel from the source of fuel supply to the burner, and said conveyor means also including a screw conveyor extending beyond the entrance end of said conduit means into the source of fuel supply, characterized by the fact that at least a part of the screw conveyor extension beyond the conduit end is flexible at a plurality of places along its length, so that the end of the extension remote from the conduit end can move bodily with respect to the portion of the conveyor means that is within the conduit.

2. A stoker having a burner and conduit means and conveyor means in the conduit means to transport fuel from the source of fuel supply to the burner, and said conveyor means also including a screw conveyor extending beyond the entrance end of said conduit means into the source of fuel supply, characterized by the fact that at least a part of the screw conveyor extension beyond the conduit end is center-shaftless.

3. A stoker having a burner and conduit means and conveyor means in the conduit means to transport fuel from the source of fuel supply to the burner, and said conveyor means also including a screw conveyor extending beyond the entrance end of said conduit means into the source of fuel supply, characterized by the fact that for at least the major part of its length said extension consists solely of a helix of screw threads.

4. A stoker having a burner and conduit means and conveyor means to transport fuel from the source of fuel supply to the burner, said conveyor means extending beyond the entrance end of said conduit means into the source of fuel supply, for a short distance beyond the entrance end of the conduit means said conveyor means having a certain capacity, and beyond the region of said capacity consisting of a screw conveyor at least a part of which is flexible and which is of lesser capacity.

5. A stoker having a burner and conduit means and conveyor means to transport fuel from the source of fuel supply to the burner, said conveyor means including a screw conveyor a portion of which projects from the entrance end of said conduit means and another portion extending beyond the first, said second mentioned portion of the screw conveyor being flexible, at least in some part, and being of lesser capacity than the first mentioned portion.

6. A stoker having a burner and conduit means and conveyor means in the conduit means to transport fuel from the source of fuel supply to the burner, and said conveyor means also including a screw conveyor extending beyond the entrance end of said conduit means into the source of fuel supply, characterized by the fact that a portion of the thread of said conveyor adjacent the entrance end of the conduit means is mounted on a center shaft, at least a part of the extension more remote from the conduit means consists solely of a helix of the said thread, and the driving means for the said thread is connected to said centre shaft.

7. In a stoker, the combination with a burner, conduit means, conveyor means to transport fuel through said conduit means from the source of fuel supply to the burner, said conveyor means including a screw conveyor having a center shaft at the entrance end of said conduit means, and means to drive said screw conveyor, of a second screw conveyor extending from adjacent the end of the first mentioned screw conveyor to form an extension of said conveyor means beyond the entrance end of the conduit means, said second screw conveyor consisting, in part, solely of the helix of its threads but having a center shaft adjacent the first mentioned screw conveyor on which its threads are mounted, the adjacent end of the first mentioned center shaft being hollow and the end of the second mentioned center shaft extending into and having a driving connection with the first mentioned center shaft.

JOHN F. FISHER.